United States Patent [19]
Kino

[11] Patent Number: 5,883,872
[45] Date of Patent: Mar. 16, 1999

[54] NEAR FIELD MAGNETO-OPTICAL RECORDING SYSTEM EMPLOYING SLIT ILLUMINATION

[75] Inventor: Gordon S. Kino, Stanford, Calif.

[73] Assignee: The Board of Trustees of the Leland Stanford Junior University, Palo Alto, Calif.

[21] Appl. No.: 865,221

[22] Filed: May 29, 1997

[51] Int. Cl.$^6$ .................................................. G11B 7/00
[52] U.S. Cl. ............................................ 369/112; 369/13
[58] Field of Search ................................. 369/13, 44.23, 369/44.24, 112, 118; 360/114; 359/661, 662, 664, 819

[56] References Cited

U.S. PATENT DOCUMENTS

| | | | |
|---|---|---|---|
| 4,581,529 | 4/1986 | Gordon | 250/227 |
| 4,679,180 | 7/1987 | Kryder et al. | 369/13 |
| 4,882,718 | 11/1989 | Kryder et al. | 369/13 |
| 4,888,750 | 12/1989 | Kryder et al. | 369/13 |
| 5,125,750 | 6/1992 | Corle et al. | 359/819 |
| 5,150,338 | 9/1992 | Birecki et al. | 369/13 |
| 5,184,335 | 2/1993 | Kryder et al. | 369/13 |
| 5,218,582 | 6/1993 | Marchant | 369/14 |
| 5,245,491 | 9/1993 | Horie et al. | 360/114 |
| 5,288,998 | 2/1994 | Betzig et al. | 250/227.26 |
| 5,295,122 | 3/1994 | Murakami et al. | 369/13 |
| 5,343,460 | 8/1994 | Miyazaki et al. | 369/126 |
| 5,389,779 | 2/1995 | Betzig et al. | 250/216 |
| 5,689,480 | 11/1997 | Kino | 369/112 |
| 5,764,613 | 6/1998 | Yamamoto et al. | 369/112 |

FOREIGN PATENT DOCUMENTS

| | | |
|---|---|---|
| 405 742 | 1/1991 | European Pat. Off. . |
| 727 777 | 8/1996 | European Pat. Off. . |
| 42 44 268 | 7/1994 | Germany . |
| 0189946 | 8/1991 | Japan ........................... 369/13 |
| 8-212579 | 8/1996 | Japan . |
| WO 97 41556 | 11/1997 | WIPO . |
| WO 98 18122 | 4/1998 | WIPO . |

*Primary Examiner*—Thang V. Tran
*Attorney, Agent, or Firm*—Flehr Hohbach Test Albritton & Herbert LLP

[57] ABSTRACT

An optical recording and reproducing system including a read/write head assembly including an objective lens for reading or writing information on an adjacent magneto-optical recording medium. A solid immersion lens is disposed between the objective lens and the recording medium with a surface closely spaced from the recording medium. The closely spaced surface is provided with a mask having an opening which defines the extent of evanescent fields coupled to the recording medium.

8 Claims, 3 Drawing Sheets

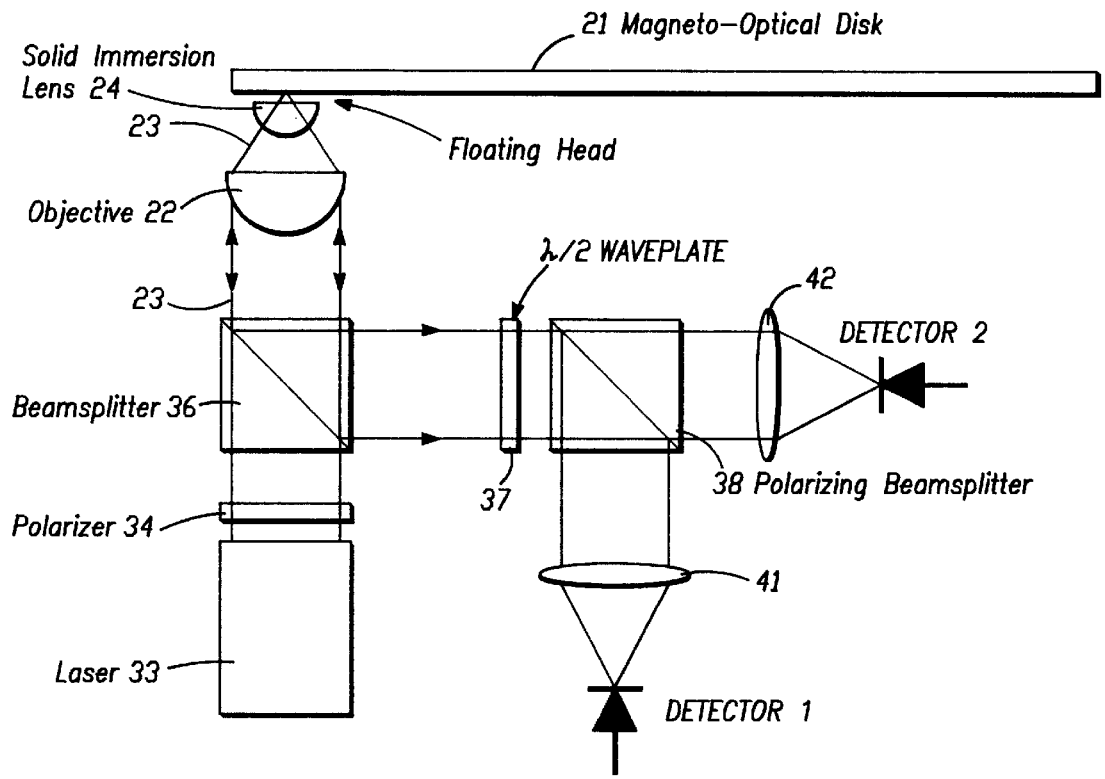
FIG.—1
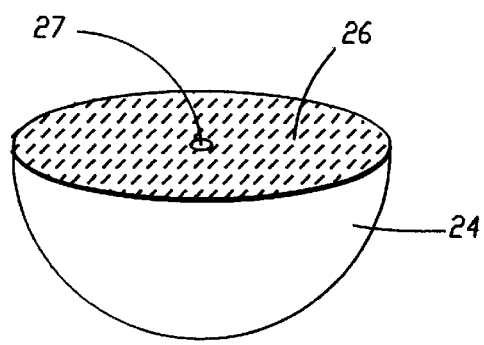
FIG.—3

NEAR FIELD MAGNETO-OPTICAL RECORDING SYSTEM EMPLOYING SLIT ILLUMINATION

BRIEF DESCRIPTION OF THE INVENTION

This invention relates generally to an optical recording system and more particularly to an optical recording system employing a solid immersion lens with slit illumination.

BACKGROUND OF THE INVENTION

In magneto-optic recording systems, digital information is stored in a thin magnetic storage medium by locally magnetized regions or domains. The regions are magnetized to represent either ones or zeros. The information is written into the magnetic storage medium by raising the temperature of localized small regions of the magnetic medium to the Curie point temperature of the medium at the localized regions. This lowers the coercivity to a point which enables orientation of the magnetic domain in the medium by an external magnetic field. Stored information is read by Kerr or Faraday rotation of a polarized light beam incident upon the magnetic medium at the magnetized regions or domains. The shift in polarization is in the order of 1 degree and is employed to detect the ones and zeros. Systems for reading out these small rotational changes are well established in the optical storage industry. Optical recording and the design of conventional read/write heads is described in the book entitled "Optical Recording" authored by Alan B. Marchant, Addison-Wesley Publishing, 1990.

The size of the regions or domains determines the density of the digital information. The size of the localized regions is limited by diffraction of the light energy and is marginally improved by use of shorter wavelengths of light and higher numerical aperture lens.

In microscopy the diffraction limitation is overcome by employing near-field microscopy. In near-field microscopy the light beam is focused through a pinhole that is smaller than the diffraction limited spot size of the light beam. The pinhole is placed very close to the object. The size of the pinhole determines the definition of the microscope.

Betzig and others overcame the diffraction limitation in an optical recording system by employing near-field optics. They demonstrated areas of 20 nm diameter or better for the magnetized regions or domains. (E. Betzig, J. K. Trautman, R. Wolfe, P. L. Finn, M. H. Kryder and C. H. Chang, "Near-Field Magneto-Optics and Hi-Density Data Storage", Appl. Phys. Lett. 61, 142–144, (1992)).

In U.S. Pat. No. 5,125,750 there is disclosed an optical recording system including a read/write optical assembly for reading or writing from a magneto-optical medium. A solid immersion lens is interposed between the objective lens of the read/write head and the magnetic recording medium. The use of the solid immersion lens in conjunction with the objective lens decreases the spot size of the light focused on the recording medium and therefore increases the optical density and resolution. The spot size is diffraction limited.

OBJECTS AND SUMMARY OF THE INVENTION

It is a general object of the present invention to provide an improved read/write head assembly for reading/writing on a magneto-optical recording medium.

It is another object of the present invention to provide a read/write head in which a solid immersion lens is interposed between the objective lens and the recording magnetic medium and the solid immersion lens is provided with a mask having an opening which defines the spot size and increases the optical recording density and resolution.

The foregoing and other objects of the invention are achieved by an optical read/write head of the type which includes an objective lens and a solid immersion lens interposed between the optical recording medium and the objective lens. The solid immersion lens is provided with a metal film or mask which includes an opening which defines the size of the magnetized regions or domains.

BRIEF DESCRIPTION OF THE DRAWINGS

The foregoing and other objects of the invention will be more clearly understood from the following description when read in conjunction with the accompanying drawings in which:

FIG. 1 is a schematic diagram of an optical recording system employing a masked solid immersion lens in accordance with the present invention.

FIG. 3 is an enlarged perspective view of a masked solid immersion lens with a pinhole opening used in the present invention.

DETAILED DESCRIPTION OF THE INVENTION

Figure 2:
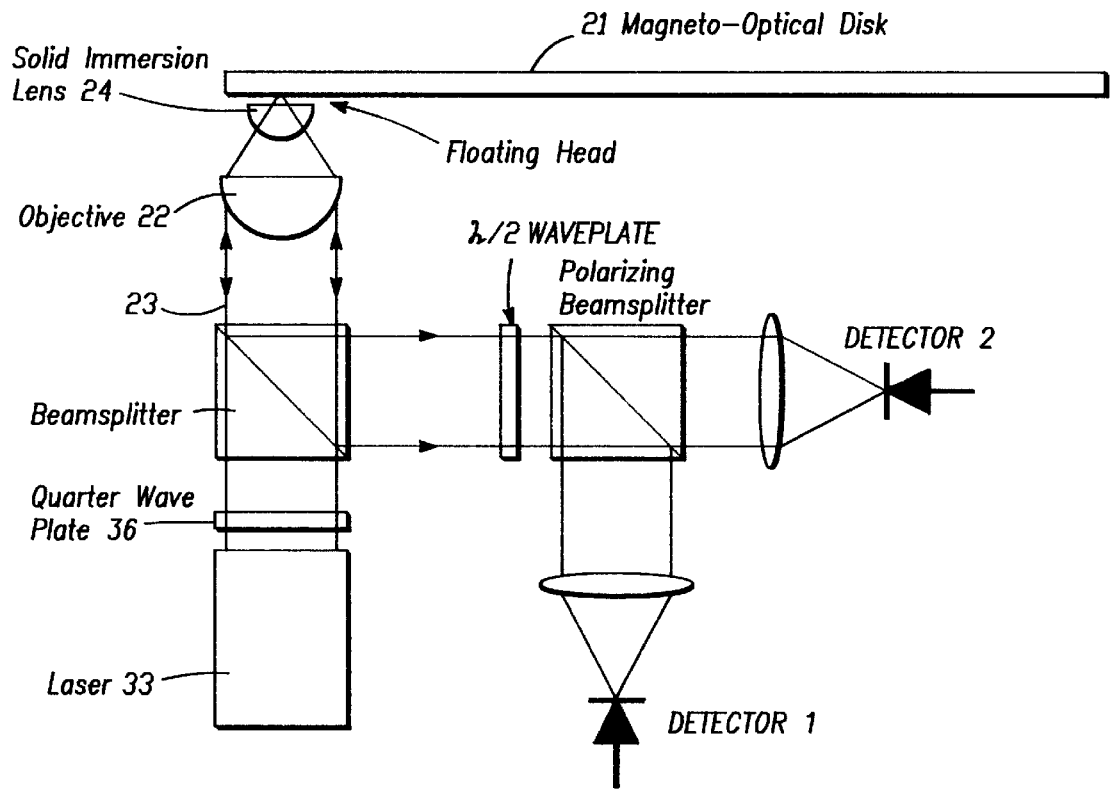
FIG. 2 is the schematic diagram of an optical reading system employing a masked solid immersion lens in accordance with the present invention.

A magneto-optic recording system employing a masked solid immersion lens in accordance with the invention is schematically illustrated in FIGS. 1 and 2. Data is recorded on and read from a magneto-optic disk 21. The disk may for example have a magneto-optical film deposited on its front surface with a silicon nitride layer typically in the order of 50 nm thick laid down on top of the magnetic layer for protection and for optimizing the field distribution. Typically the magneto-optic film may have a silicon nitride backing on aluminum and have a thin film of silicon nitride deposited on its front surface for protection. As with more conventional systems a good example of a suitable magneto-optic material would be TbFeCo.

The optical head includes an objective lens 22 which focuses the light 23 into the floating solid immersion lens 24. The solid immersion lens provides a higher numerical aperture as described in U.S. Pat. No. 5,125,750. The position on the disk of the objective lens and solid immersion lens are maintained by a servosystem (not shown). Preferably the solid immersion lens is maintained at a height of approximately 50 nm above the optical disk. The solid immersion lens is maintained spaced from the disk by an air bearing (a floating solid immersion lens).

In accordance with the present invention a metal film 26 is deposited on the flat surface of the solid immersion lens. The film is then etched to form an opening which defines the size and shape of the light spot striking the recording medium. The metal film is as thin as possible while being opaque to mask the light. The size of the opening determines the optical recording/reproducing density and resolution of the read/write system. The opening may be defined for instance by standard electron beam lithographic methods or by use of a tunneling microscope lithographic technique. Such techniques permit the formation of very small openings to thereby increase the resolution of the read/write optical system of the present invention.

Figure 4:
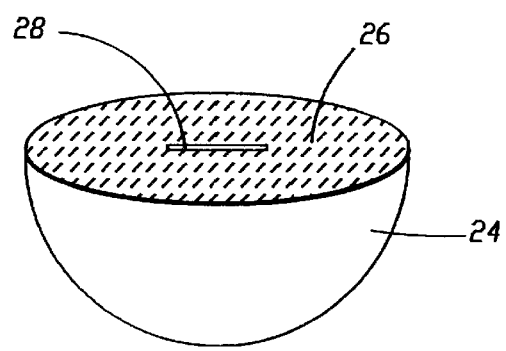
FIG. 4 is an enlarged perspective view of a masked solid immersion lens with a slit opening used in the present invention.

Referring to FIG. 3, the solid opaque mask or metal film 26 is provided with a pinhole 27 which defines the spot size and the size of the recorded magnetic domain. In FIG. 4, the metal film is provided with a slit 28 oriented across the tracks whereby the width of the slit defines the size of the magnetic domain along a track. A portion of the slit may be illuminated to write/read while a portion may be illuminated to position the read/write head with respect to the recording medium. It is apparent that in the embodiments of FIGS. 3 and 4 the intensity of the light must not raise the temperature of the recording medium above the Curie temperature when the recorded data is read or the recorded data would be erased.

Figure 5:
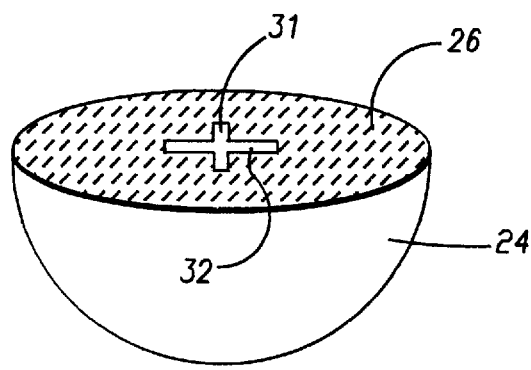
FIG. 5 is an enlarged perspective view of a masked solid immersion lens used in the present invention having an opening defined by crossed slits.

The preferred embodiment of the mask is shown in FIG. 5. It includes crossed slits 31 and 32. The slits will be in the order of 0.05–0.2 μm wide, but their width may be smaller or larger than these values depending upon the desired recording density. The length of the slits is at least one-half wavelength of the light for the slit material with an effective refractive index n, where n is a refractive index slightly less than that of the lens material. For example with a solid immersion lens of refractive index 2.1 and a free space wavelength of 680 nm, the length of the slits would have to be slightly more than 162 nm. The width, however, could be 50 nm or less.

Referring particularly to FIG. 1, when information is to be stored or written on the magneto-optic disk 21, the pinhole 27 or slit 28 are illuminated with light of sufficient intensity to raise the temperature of the magneto-optic material above the Curie temperature. In the crossed slit embodiment the light intensity in each slit is such as to heat the media below the Curie temperature, except at the crossing where the combined intensity heats the media above the Curie temperature. In the crossed slit embodiment this can be done either by rotating a polarizer 34, such as shown in FIG. 1, in front of the light source or laser 33 or by inserting a quarter wave plate 36, FIG. 2, with its principal axis at 45° with respect to the input polarization of the laser so that polarization is rotated 45° and both slits are equally excited. If the laser is unpolarized, then removing the polarizer or the wave plate would do just as well.

In all embodiments the applied magnetic field will form well-defined magnetic domains. In the crossed slit embodiment it is clear that the crossover area may be a fraction of a wavelength in area. Data is recorded by modulating the laser as the disk rotates. Tracking is accomplished by detecting reflected light from the horizontal slit 32 in the same manner as will be described in the read mode of operation.

In the reading mode the light energy at the recorded domains is of an intensity which does not raise the temperature of the medium above the Curie point.

In the reading mode for crossed slits light from the laser 33 is polarized by polarizer 34, passes through the beam splitter, and is focused by the objective lens onto the masked solid immersion lens. The light is polarized so that the E fields in the horizonal slit 28 extending across the slit in the track direction.

In all instances the reflected fields which are rotated by the Kerr or Faraday rotation are picked up and reflected by beam splitter 36 into the one-half wave plate 37 and through the polarizing beam splitter 38 and focused on detectors 1 and 2 by lens 41 and 42. Light reflected through the horizonal slit passes through the same optical elements and can be used for positioning of the heads with respect to the tracks as well as for reading the recorded data.

If the direct reflected signal through the horizontal slit is of amplitude A and the rotated component through the vertical slit is of amplitude B, by using a half wave plate 37 followed by a polarizing beam splitter 38 signals are provided to detectors 1 and 2. The value of the signals are A+B, $(A+B)^2$ and $(A-B)^2$. The difference of these signals is proportional to 2AB and thus proportional to the amplitude of the rotated component. Since $A^2$ is very much greater than $B^2$ the sum of the two signals would be essentially $A^2$. One of the detectors can have two or more phototransducers and can be used for tracking and focusing.

Figure 6:
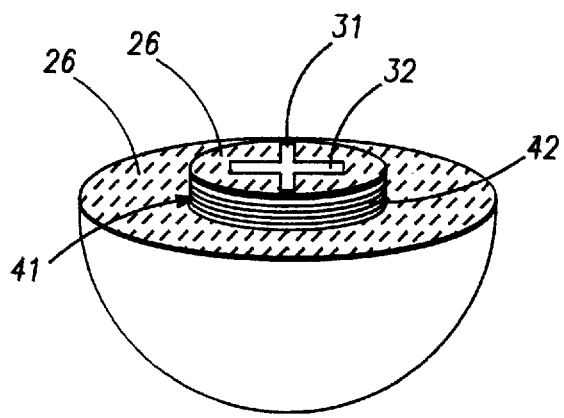
FIG. 6 is an enlarged perspective view of another masked crossed slit solid immersion lens used in the present invention.

The flat surface of the solid immersion lens may be provided with a snout 41, FIG. 6, onto which a coil 42 can be wound to apply magnetic fields during recording. When a snout is provided the metal film 26 is also formed on the surface of the snout.

There has been provided a system in which an apertured optically masked solid immersion lens is used so that the size of the aperture can be made as small as possible to determine the size of the magnetic domains. The apertures can be accurately formed by lithographic techniques.

What is claimed is:

1. An optical recording and reproducing system including a read/write head assembly for reading or writing information on a magneto-optical recording medium including a solid immersion lens having a spherical surface and a flat surface closely spaced from said recording medium, said solid immersion lens serving to focus light energy onto the recording medium, and an objective lens for focusing light energy into the solid immersion lens, the improvement comprising an opaque mask on the flat surface of the solid immersion lens, and an opening in said mask to form evanescent fields which interact with the recording medium.

2. An optical recording and reproducing system as in claim 1, in which the mask opening is a pinhole.

3. An optical recording and reproducing system as in claim 1, in which the mask opening is a slit.

4. An optical recording and reproducing system as in claim 1, in which the mask opening comprises crossed slits.

5. An optical recording and reproducing system including a read/write head assembly for reading or writing information on a magneto-optical recording medium including a solid immersion lens having a spherical surface and a flat surface having a snout with a flat surface closely spaced from said recording medium, said solid immersion lens serving to focus light energy onto the recording medium, and an objective lens for focusing light energy into the solid immersion lens, the improvement comprising an opaque mask on at least the flat surface of said snout, and an opening in said mask to form evanescent fields which interact with the recording medium.

6. An optical recording and reproducing system as in claim 5, in which the mask opening is a pinhole.

7. An optical recording and reproducing system as in claim 5, in which the opening is a slit.

8. An optical recording and reproducing system as in claim 5, in which the opening comprises crossed slits.

* * * * *